July 13, 1965
D. O. MILES
3,194,064
SINUSOIDAL SHEAR GENERATOR
Filed Nov. 2, 1961
4 Sheets-Sheet 1
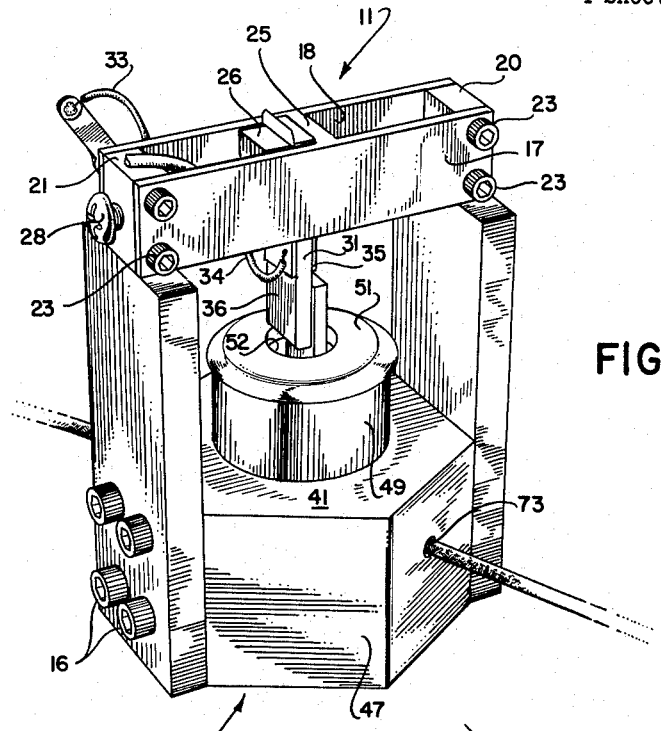
FIG_1
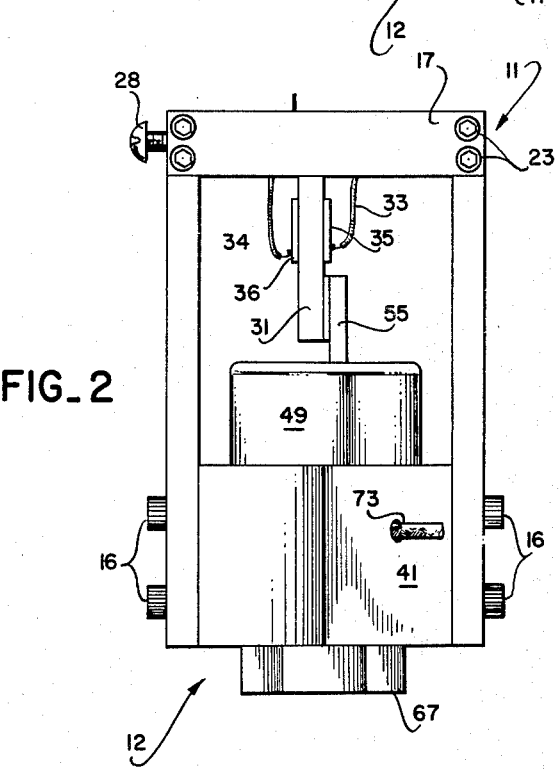
FIG_2
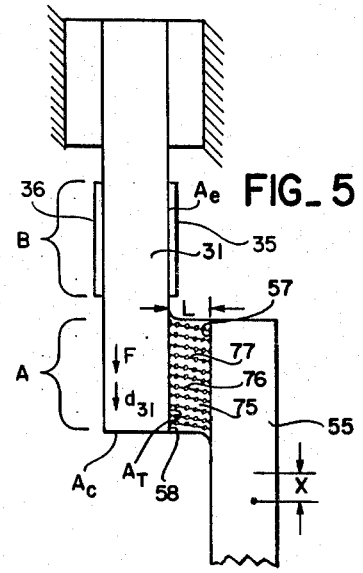
FIG_5
INVENTOR.
DUANE O. MILES
BY
*George C. Sillers*
Agent July 13, 1965 D. O. MILES 3,194,064
SINUSOIDAL SHEAR GENERATOR
Filed Nov. 2, 1961 4 Sheets-Sheet 2
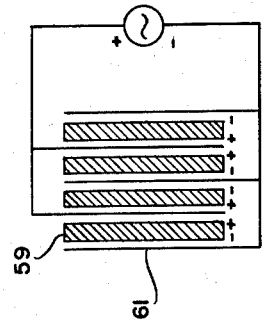
FIG_3A
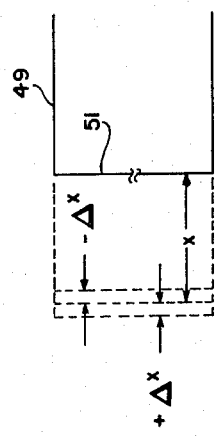
FIG_3B
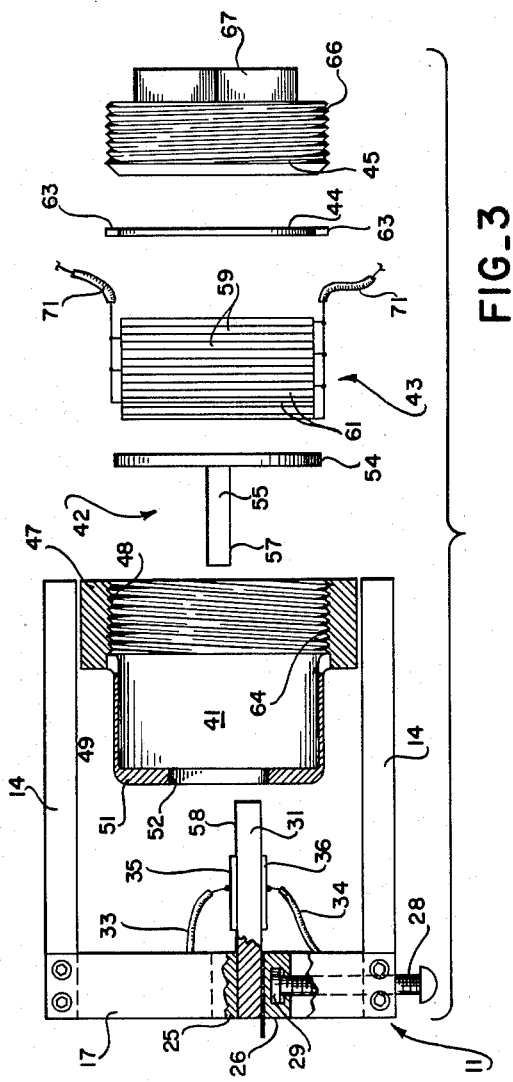
FIG_3
INVENTOR
DUANE O. MILES
By
*George C. Sullivan*
Agent July 13, 1965 D. O. MILES 3,194,064
SINUSOIDAL SHEAR GENERATOR
Filed Nov. 2, 1961 4 Sheets-Sheet 3
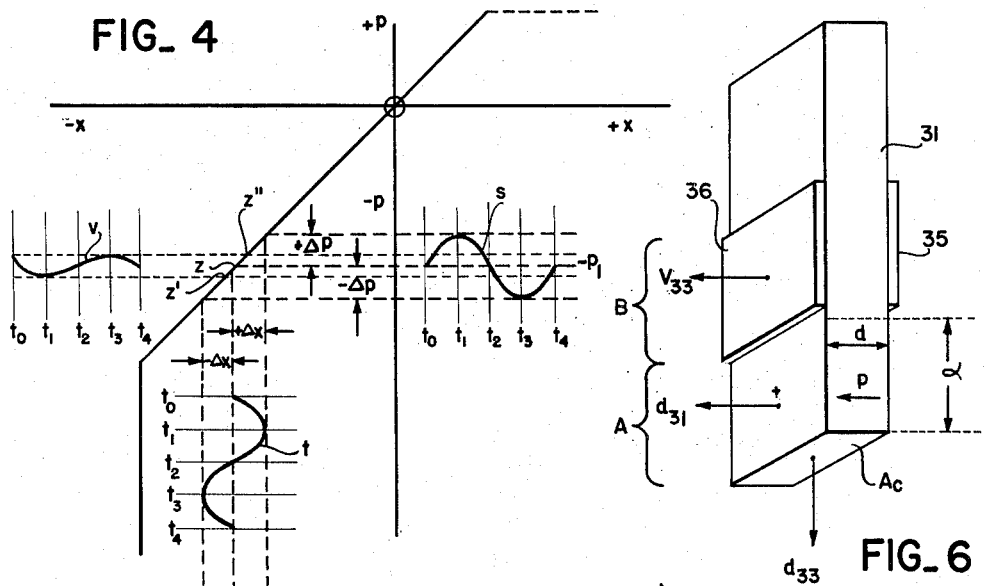
FIG. 4
FIG. 6
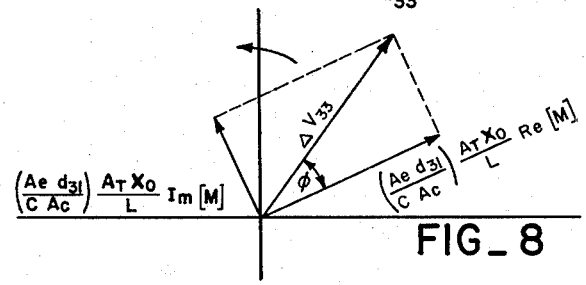
FIG. 8
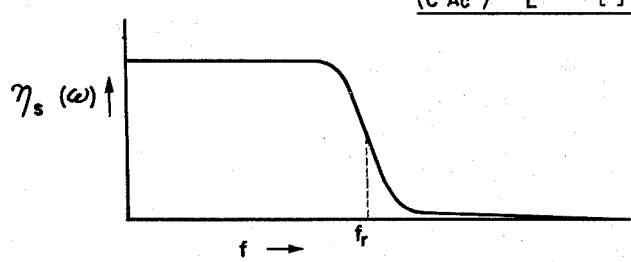
FIG. 7A
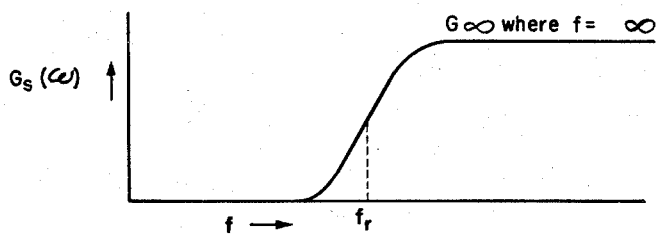
FIG. 7B
INVENTOR.
DUANE O. MILES
BY
George O. Sullivan
Agent

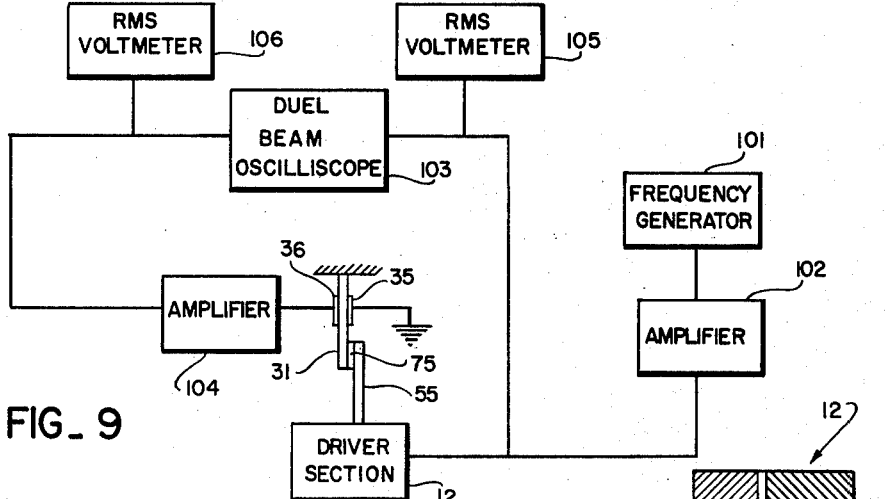
FIG_9
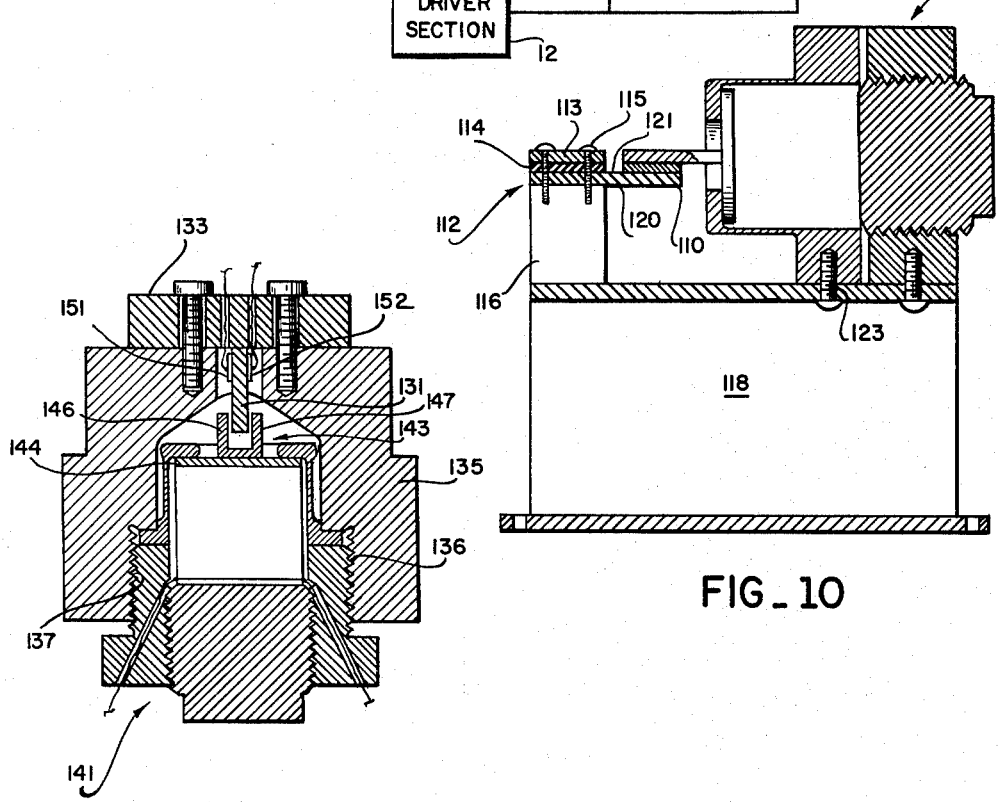
FIG_10
FIG_11

United States Patent Office 3,194,064
Patented July 13, 1965

3,194,064
SINUSOIDAL SHEAR GENERATOR
Duane O. Miles, Sunnyvale, Calif., assignor to Lockheed Aircraft Corporation, Burbank, Calif.
Filed Nov. 2, 1961, Ser. No. 149,573
7 Claims. (Cl. 73—101)

The present invention relates to a sinusoidal shear generator and more particularly to a sinusoidal shear generator capable of measuring both the shear viscosity and shear rigidity of materials in either the liquid or solid state as a function of frequency, temperature and ambient static pressure.

In the investigation of materials it is frequently necessary to determine the shear rigidity and shear viscosity of the materials under investigation. It is generally desirable to determine these characteristics as a function of frequency, temperature and pressure regardless of whether the material under investigation is in the liquid or solid state.

The present invention provides a device by which these characteristics are readily measured as a function of these parameters irrespective of whether the material is a liquid or a solid. In addition, this invention may be employed to run quality control and performance testing on such materials as road tars, roofing asphalts, waxes, lubricating oils and greases, structural solids such as plastics, epoxies or metals and the like.

This is accomplished by a technique which utilizes the characteristics of piezoelectric material wherein a known strain is applied to the material under investigation and the resulting stress in the material is transmitted to and measured by the piezoelectric material. The transmitted stress is the resultant of the forces attributable to the shear viscosity and the shear rigidity of the material under investigation. It has been found that since the transmitted component of force attributable to the shear rigidity is instantaneous, the applied force and the transmitted component force attributable to the shear rigidity are in phase. Knowing the parameters of the system, and that the transmitted component of force attributable to the shear viscosity is 90 degrees out of phase with respect to the transmitted component force attributable to the shear rigidity, it is possible to determine the actual values of shear rigidity and shear viscosity provided the resultant transmitted force and the phase angle between the resultant transmitted force and the transmitted component force attributable to the shear rigidity are known. These above-mentioned forces have fixed proportions to voltages measured by the hereinafter described embodiments. Therefore, the herein described embodiments are directed towards an electrical system which utilizes the characteristics of piezoelectric material to measure the shear viscosity and/or shear rigidity of solid or liquid materials as a function of frequency, temperature and pressure.

Accordingly, an object of the present invention is to provide a sinusoidal shear generator.

Another object of the present invention is to provide a device capable of measuring the shear viscosity and/or shear rigidity of liquids or solids.

Still another object of the present invention is to provide a device utilizing the characteristic of piezoelectric material for measuring the shear viscosity and/or shear rigidity of liquid or solid materials as a function of frequency, pressure and temperature.

A further object of the present invention is to provide a device in which a strain is applied to the material under investigation and sensing the resulting stress transmitted through material under investigation by piezoelectric material.

A still further object of the present invention is to provide a simple, inexpensive and accurate device for measuring the shear rigidity and/or shear viscosity of materials.

The specific nature of the invention, as well as other objects, uses and advantages thereof, will clearly appear from the following description and from the accompanying drawings in which:

FIGURE 1 is a perspective view of one embodiment of the present invention.

FIGURE 2 is a side elevation of the embodiment shown in FIGURE 1.

FIGURE 3 is an exploded view of the embodiment shown in FIGURE 1.

FIGURE 3A is a schematic illustration of the driver employed in all embodiments of the present invention.

FIGURE 3B is a diagram illustrating the biasing of the cylindrical section employed in all embodiments of the present invention.

FIGURE 4 is a diagram illustrating the operation of the driver section of all embodiments of the present invention.

FIGURE 5 is an enlarged view of the piezoelectric plate, drive plate and material under investigation of all embodiments of the present invention.

FIGURE 6 is an enlarged perspective view of the piezoelectric plate of the embodiment shown in FIGURE 1.

FIGURES 7A and 7B are diagrams illustrating typical theoretical curves of shear viscosity and shear rigidity as a function of frequency.

FIGURE 8 is a diagram illustrating the voltage and phase angle characteristics attributive to the shear viscosity and rigidity characteristics of the material being investigated.

FIGURE 9 is a schematic illustration of a circuit which is employed to determine the shear rigidity and shear viscosity of the material under investigation and may be used with all embodiments of the present invention.

FIGURE 10 is a side elevation, partly in section, of another embodiment of the present invention.

FIGURE 11 is a side elevation, partly in section, of still another embodiment of the present invention.

Like numerals designate like elements throughout the figures of the drawings.

FIGURE 1 is a perspective view, FIGURE 2 is a side elevation and FIGURE 3 is an exploded view of one embodiment of the present invention. Reference numeral 11 generally denotes the sensing section and reference numeral 12 generally denotes the driver section. Sensing section 11 is mounted on the ends of support plates 14 as by means of weld, bolts or the like. Driver section 12 is mounted on the flat faces at the other ends of support plates 14 by bolts 16 or the like. The function of support plates 14 is to maintain the sensing and driver sections in a predetermined fixed spaced relation with respect to each other. It is to be understood that many different types of structural arrangements may be employed to maintain fixed spaced relation between the sensing and driver sections and the above method is considered to be exemplary. Sensing section 11 includes support members 17 and 18 which are maintained in spaced relation by spacing elements 20 and 21 which are disposed at opposite ends and rigidly attached thereto by means of bolts 23 or the like. Member 25 is disposed between and rigidly connected to support members 17 and 18 such that the plane of the inner surface thereof is parallel to the plane surface of the hereinafter described driver plate. Member 26 has a width slightly less than the distance between support members 17 and 18 and is longitudinally slidable along the space formed therebetween. Screw 28 having a large diameter section 29 at one end, which is disposed in a cavity in member 26, cooperates with corresponding threads formed in spacing element 21. Member 26 is moved away from member 25 by rotation of screw 28 in one direction and towards member 25 when rotated in the other direction thereby forming a clamping device which is employed to hold piezoelectric plate 31 in a predetermined position. The function of piezoelectric plate 31 will be hereinafter described with relation to the over-all operation of the system. One end of piezoelectric plate 31 is disposed between support member 18 and member 26 and rigidly held in position by rotation of screw 28 such that plate 26 is in forced facial contact therewith. Lateral adjustment of piezoelectric plate 31 may be accomplished by disposing shims of predetermined thickness between member 25 and the clamped end of piezoelectric plate 31. Electric leads 33 and 34 are taken from piezoelectric plate electrodes 35 and 36, respectively.

It will be noted that piezoelectric material, from which piezoelectric plate 31 is made, has high resistivity and therefore it is not necessary to employ additional electrical insulation provided capacitor plate electrodes 35 and 36 are spaced from and not in contact with members 17, 18, 25 or 26. Since the end of piezoelectric plate 31 is restrained from motion by members 25 and 26, little, if any, voltage will be generated thereacross. However, if a small voltage is generated, it will be shorted out by members 17, 18, 25 and 26 thereby preventing interference by stray voltages.

As best depicted in the exploded view of FIGURE 3, driver section 12 includes housing 41, driver member 42, driver assembly 43, retainer disc 44 and plug 45. Housing 41 includes a large diameter section 47 having a hexagonal exterior surface and internal threads 48, cylindrical section 49 and one end is partially closed by collar 51 having a cylindrical opening 52 formed thereby. It is to be understood that housing 41 may be readily designed to have many different configurations provided it functions in the hereinafter defined manner. Such modification may be, for example, change in relative dimensions, change in surface configuration of section 47, change in the configuration of opening 52 and the like. Driver member 42 consists of cylindrical plate 54 and plate 55 which has the longitudinal axis thereof normal to the plane of plate 54. Plate 55 has a rectangular cross section and surface 57 thereof is plane and is parallel to and spaced from plane surface 58 of piezoelectric plate 31.

Driver section consists of a plurality of discs 59, which may be made of barium titanite, lead zirconium titanite, or of like material which may be polarized and demonstrate piezoelectric characteristics. As schematically illustrated in FIGURE 3A, discs 59 are stacked such that adjacent faces of adjacent discs have like polarity. Electrode plates 61, having about the same surface area and configuration as discs 59, are disposed between the discs wherein alternate electrode plates are connected in parallel to a generator source. When the generator provides an A.-C. signal, during one-half cycle of this signal the electrodes and corresponding surfaces of the discs have like polarity and the discs expand. Whereas, during the opposite half cycle, unlike polarities exist and the discs contract. Since discs 59 and plates 61 are stacked in facial contact they are mechanically in series and the overall expansion and contraction is the summation of expansion and contraction of each disc. Facial contact between the discs 59 and plates 61 is realized during expansion and contraction by the hereinafter described spring bias function of cylinder 49.

Retainer disc 44 is circular and has extensions 63 depending from the periphery thereof and which correspond with slots 64 in section 47. Plug 45 has external threads 66, which correspond with threads 48 in section 47, and is provided with nut 67 to which a wrench may be connected.

The function and operation of driver section 12 will now be described in conjunction with the exploded view of FIGURE 3 and the enlarged view of plates 31 and 55 shown in FIGURE 5. Driver member 42 is inserted in cylindrical section 49 with the forward surface of plate 54 in facial contact with collar 51 such that plate 55 extends through opening 52 with plane surface 57 parallel to and spaced from plane surface 58 of piezoelectric plate 31. Driver section 43 is inserted in cylindrical section 49 with the forward surface of the end plate 61 in facial contact with the rear surface of plate 54. Lead wires 71 are inserted through openings 73 which are formed in section 47 and are then connected to a source of sinusoidal voltage. The outside diameter of driver section 43 is less than the inside diameter of cylinder 49 and is concentrically disposed therein to prevent frictional drag therebetween. Retainer disc 44 is inserted into facial contact with the rear surface of plate 61. Extension 63 of retainer disc 44 is mounted in engagement with slots 64 to prevent any rotation thereof and to prevent imparting any rotation to driver section 43. Plug 45 is then rotated into facial contact with the rear surface of retainer disc 44 and a force is applied thereto having a magnitude sufficient to bring about the following described operation.

A particularly important feature of the present invention is that cylinder 49 has a thin wall and functions as a linear spring. That is, plug 45 is rotated to apply a force which is transmitted from retainer disc 44 to collar 51. The force and spring constant of cylinder 49 are selected to cause a total elongation of cylinder 49 corresponding to a distance $(x)$ as illustrated in FIGURE 3B. Depending upon the frequency of operation and the mass of the components employed, the distance $(x)$ may be selected to be much greater than the distances represented by $+\Delta x$ and $-\Delta x$ in FIGURE 3B. The maximum total elongation of driver section 43, when an assumed positive signal is applied thereto, is represented by $+\Delta x$ and the maximum total contraction of the driver section, when an assumed negative signal is applied to the driver section, is represented by $-\Delta x$. When the driver section elongates, driver member 42 will move to the left and cylinder 49 will elongate by an amount corresponding to the elongation. The converse is applicable when the driver section contracts. The linear spring action of cylinder 49 has the primary function of maintaining a force on collar 51, plate 54, the discs of driver section 43, retainer disc 44 and the front face of plug 45 such that no spacing is formed between adjacent elements when the driver section is expanding and contracting. That is, driver member 42 always follows the motion of driver section 43 such that when driver section 43 exhibits sinusoidal displacement, driver member 42 will exhibit the same sinusodial displacement. The residual force applied to cylinder 49 by rotation of plug 45 is determined by the frequency of operation as well as the mass of driver member 42. It is important that the elastic limit of cylinder 49 not be exceeded. It is also important that the pressure applied to the discs of driver section 43 not exceed that amount which would result in operation thereof in the non-linear region as depicted by the "B" section of the characteristic curve shown in FIGURE 4.

The abscissa of the characteristic curve of FIGURE 4 represents the total elongation $(+x)$ and the total contraction $(-x)$ of piezoelectric material when subjected to a pressure which is represented along the ordinate. The pressure $(+p)$ represents force per unit area when the piezoelectric material is in tension and the pressure $(-p)$ represents the force per unit area when in compression. It should be noted when a stack of piezoelectric discs are employed, as in driver section 43, the discs may be cemented together by an epoxy resin and will therefore be able to withstand a force applied in tension. The compression pressure $(-p)$ to which driver section 43 is subjected determines the operating point along the characteristic curve. Assume a compression pressure $(-p)$ is selected which sets the operating point at point "z" on the A section of the characteristic curve and a sinusoidal voltage signal is applied to the material. Since the applied voltage signal is proportional to force (i.e. $V \alpha F$), the force per unit area or pressure $(p)$ may be shown as varying from $+\Delta p$ to $-\Delta p$. If a constant operating point were realized (for example, point "z") during application of the sinusoidal voltage signal as represented by sinusoidal curve "s," the motion defined by driver section 42 would be sinusoidal as represented by curve "t." However, since the bias on cylinder 49 varies during application of the voltage signal as illustrated by curve "v," there is a resultant dampening of the amplitude of oscillations of driver member 42 as denoted by curve "y." It should be noted that curve "v" is 180° out of phase with relation to curve "s" and the operating point will have limits of $z'$ and $z''$ corresponding with times $t_1$ and $t_3$, respectively. It will also be appreciated that when curve "v" is maintained at minimum amplitude, member 42 exhibits maximum oscillation. The amplitude ratio of curve "v" with respect to curve "s" is determined by the spring constants selected for cylindrical section 49 and discs 59 of driver section 12. The equation which is definitive of the relationship between cylindrical section 49 and driver section 12 may be expressed as:

(1) $$\Delta x = \frac{K_c}{K_c + K_D} n d_{33} V$$

where $\Delta x$ is the amplitude of oscillation of cylindrical section 49 and driver section 12, $K_c$ is the spring compliance of cylindrical section 49, $K_D$ is the spring compliance of driver section 12, $n$ is the total number of discs in the driver 12, $d_{33}$ is the longitudinal piezoelectric coefficient, and V is the voltage applied to the driver 12.

From Equation 1 it can be seen that $\Delta x$ is inversely proportional to the sum of $K_c$ and $K_D$. Since it is desirable to maintain minimum attenuation, it is desirable that $K_c$ have a minimum value. However, it is mandatory that the force exerted by cylindrical section 49 be of sufficient value that the rear surface of cylindrical plate 54 remain in facial contact with forward electrode plate 61 during maximum accelerations and with samples of high shear moduli. It will be appreciated that this same force may be obtained by employing a large spring constant $K_c'$ and a small movement $(x')$ or a small spring constant $K_c''$ and a large movement $(x'')$ which may be expressed as:

$$F = K_c' x' = K_c'' x''$$

where $$K_c' > K_c'' \text{ and } x' < x''$$

It is preferable to employ a small spring constant $K_c$ since there is minimum attenuation; however, it is necessary to apply a relatively large force and therefore the relationship of $(x)$ to $\Delta x$, as depicted in FIGURE 3B, is such that $(x)$ is much larger than $\Delta x$ $(x \gg \Delta x)$.

By selecting a relatively small spring constant $K_c$ for cylindrical section 49, plug 45 is rotated to cause a relatively large elongation $(x)$ of cylindrical section 49 thereby establishing an operating point $(z)$ of FIGURE 4 which exerts a pressure $(-p_1)$ sufficient to prevent separation during maximum acceleration or with samples of large shear moduli. If $K_c$ must be increased to a magnitude approaching $K_D$ to accommodate a sample of high modulus, the resulting attenuation of the motion $\Delta x$ is easily corrected by increasing the driving voltage.

In view of the foregoing it can be seen that surface 57 of driver plate 55 is caused to sinusoidally oscillate in a direction coincident with the longitudinal axis thereof and coincident with the longitudinal axis of piezoelectric plate 31. As previously noted, the plane of surface 57 and driver plate 55 is adjusted to be spaced apart and parallel to the plane of surface 58 of piezoelectric plate 31. It has been found that the force due to the friction between cylindrical plate 54 of driver plate 42 and collar 51 is sufficient to prevent rotation of driver plate 42 and therefore surface 57 will remain parallel to surface 58 during operation. In the space between these surfaces is disposed the liquid or solid the shear viscosity and shear rigidity of which is to be investigated.

Perhaps the most unique function of the present invention resides in its capability of providing a technique where it is possible to directly measure both the shear viscosity $(\eta_s)$ and the shear rigidity $(G_s)$ conveniently as a function of frequency. Theoretically shear viscosity $(\eta_s)$ may be expressed by the relationship:

(2) $$\eta_s(\omega) = \frac{G_\infty \tau_s}{1 + \omega^2 \tau_s^2}$$

where $G_\infty$ is the shear rigidity at infinite frequency, $\omega$ is the angular velocity in radians per second, and $\tau_s$ is expressed by the relationship:

(3) $$\tau_s = \frac{1}{2 \pi f_\gamma}$$

where $f_\gamma$ is the frequency at the center of the relaxation region as illustrated in FIGURES 7A and 7B.

The shear rigidity may be theoretically expressed by the relationship:

(4) $$G_s(\omega) = \frac{\omega^2 \tau_s^2}{1 + \omega^2 \tau_s^2}$$

where the terms are as above defined.

The theoretical Equations 2 and 4 assume a liquid in which all molecules relax with the same time $\tau_s$. Actually, real liquids have a statistical distribution of relaxation times rather than a single time. The present invention provides a convenient method for evaluating the distribution of relaxation times in liquids and possibly solids.

Operation of the present invention is performed by disposing material 75, which is to be tested, between piezoelectric plate 31 and driver plate 55 such that material 75 is in intimate contact with surfaces 57 and 58. As previously explained, driver plate 55 is caused to sinusoidally oscillate in the vertical direction as viewed in FIGURE 5. The shear viscosity and shear rigidity of the material cause a force to be transmitted from surface 57 through material 75 to surface 58. The force which is transmitted to surface 58 of piezoelectric plate 31 is transformed into a voltage across electrodes 35 and 36. Material 75 is illustrated as consisting of a plurality of molecules 76 which are interconnected by bonds 77. It is presently thought by many that the intermolecular forces arising from the bonds and other electrostatic phenomena may contribute to the shear modulus of the material. Nevertheless, a force is transmitted across the material which is proportional to the shear modulus thereof. In the most general case, the modulus is complex, the real part being the shear rigidity and the imaginary part divided by angular velocity being the shear viscosity.

In FIGURE 6 is shown an enlarged view of piezoelectric plate 31. It is assumed piezoelectric plate 31 is polarized in the direction P and has the charge shown. The equation which is definitive of the $V_{33}$ voltage output from piezoelectric plate 31 when a force is applied in the $d_{31}$ direction may be expressed as follows:

(5) $$\Delta V_{33} = \frac{A_e d_{31}}{C} \left( \frac{\Delta F}{A_c} \right)$$

where $A_e$ is the monitor plate electrode area, $d_{31}$ is the piezoelectric coefficient in the direction transverse to the plane of the electrodes, C is the capacitance of the monitor plate formed by electrodes 35 and 36, F is the force applied in the $d_{31}$ direction and $A_c$ is the area transverse to the $d_{31}$ direction.

The forces applied by material 75 are cumulative along surface 58 of piezoelectric plate 31. This area is denoted by the A bracket section of FIGURES 5 and 6 and will be referred to as the force collecting area. It will be particularly noted that no electrodes are provided in this force collecting area since each increment of this section will be subjected to a different force and a corresponding different elongation or contraction at a given instant of time during operation. Therefore, the electrodes are disposed at a position which will sense the integrated or total force which position is denoted by the B bracket section of FIGURES 5 and 6.

As best depicted in FIGURE 5, the force which is transmitted through the material being tested is directly proportional to the contact area ($A_T$), the force transmitting coefficient ($M$) and the relative displacement $x$, and is inversely proportional to the distance ($L$) through which it is transmitted. This relationship may be expressed as follows:

(6) $$F = MA_T\left(\frac{x}{L}\right)$$

The force transmitting coefficient ($M$) is complex, and may be expressed in terms of shear rigidity and shear viscosity by the relationship:

(7) $$M = Re[M] + iIm[M]$$

where $Re[M]$ is the shear rigidity and $$\frac{1}{\omega}Im[M]$$

is the shear viscosity. $M$ may be referred to as the complex shear modulus.

Equation 7 may be written as $$M = Re[M] + \frac{i\omega}{\omega}Im[M]$$

Substituting in Equation 6, we obtain:

(8) $$F = \left\{Re[M] + \frac{i\omega}{\omega}Im[M]\right\}A_T\left(\frac{x}{L}\right)$$

We now see that the $M$ is an operator, which, in its expanded form will operate on $x$.
Since $x = x_0 \sin \omega t$:

(9) $$F = \frac{A_T}{L}\left\{Re[M] + \frac{i\omega Im[M]}{\omega}\right\}x_0 \sin \omega t$$

Carrying out the differentiation provided by the $i\omega$ operator, Equation 9 becomes:

(10) $$F = \frac{A_T x_0}{L}Re[M]\sin \omega t + \frac{A_T x_0}{L}\frac{Im[M]}{\omega}\omega \cos \omega t$$

As previously illustrated, force applied to the piezoelectric material in the $d_{31}$ direction exhibits a $V_{33}$ voltage. Therefore, the simultaneous solution of Equations 5 and 10 provide a technique by which the shear rigidity and shear viscosity may be directly measured as a function of voltage. The simultaneous solution of Equations 5 and 10 is:

(11) $$\Delta V_{33} =$$

$$\left(\frac{A_e d_{31}}{CA_c}\right)\frac{A_T x_0}{L}Re[M]\sin \omega t + \left(\frac{A_e d_{31}}{CA_c}\right)\frac{A_T x_0}{L}Im[M]\cos \omega t$$

By inspection of Equation 11 it can be seen that $\Delta V_{33}$ is directly proportional to the instantaneous summation of two voltages, one due to the shear rigidity and the other due to the shear viscosity. It should be particularly noted that the shear rigidity voltage and the shear viscosity voltage are mutually orthogonal. In FIGURE 8 is shown a voltage diagram of Equation 11 and it will be appreciated that the shear rigidity or $\sin \omega t$ term is instantaneous and is in phase with the sinusoidal signal applied to driver section 43. The shear viscosity or $\cos \omega t$ term has a 90° phase lead with respect to the shear rigidity and driver voltages. The actual voltage output $V_{33}$ is therefore the vector sum of the shear rigidity and shear viscosity voltages and the angle $\phi$ is the phase angle between the shear rigidity voltage and output voltage $V_{33}$.

From the voltage diagram of FIGURE 8 it can be seen that

(12) $$V_{33} \cos \phi = \left(\frac{A_e d_{31}}{CA_c}\right)\frac{A_T x_0}{L}R_e[M]$$

and rewriting Equation 12 in terms of shear rigidity [$G_s(\omega)$] as a function of frequency is as follows:

(13) $$G_s(\omega) = R_e[M] = K_1\frac{L}{A_T x_0}V_{33}\cos \phi$$

It can also be seen from the voltage diagram of FIGURE 8 that

(14) $$V_{33} \sin \phi = \left(\frac{A_e d_{31}}{CA_c}\right)\frac{A_T x_0 Im[M]}{L}\omega$$

and rewriting Equation 14 in terms of shear viscosity [$\eta_s(\omega)$] as a function of frequency is as follows:

(15) $$\eta_s(\omega) = \frac{Im[M]}{\omega} = \frac{1}{\omega}K_1\frac{L}{A_T x_0}V_{33}\sin \phi$$

In Equations 13 and 15, $K_1$ is equal to $$\frac{CA_c}{A_e d_{31}}$$

and will remain constant irrespective of changes in $A_c$ since the capacitance ($C$) can be shown to change accordingly to maintain $K_1$ constant. It should be noted that $L$, $A_T$ or $x_0$ may be changed to provide suitable performance when testing different materials.

In FIGURE 9 is shown a schematic illustration of a circuit which is employed to determine the values of the shear rigidity and shear viscosity terms. A sinusoidal output signal from frequency generator 101 is amplified by amplifier 102 and applied in parallel to driver section 12 and to one beam of dual beam oscilloscope 103. As previously explained, plate 55 sinusoidally oscillates as a result of the sinusoidal voltage input to driver section 12 and force is transmitted through material 75 to piezoelectric plate 31. The instantaneous integrated force transmitted to piezoelectric plate 31 is converted into a voltage ($V_{33}$) across the monitor electrode plates 35 and 36 as previously explained. The output voltage ($V_{33}$) from capacitor electrode plates 35 and 36 is amplified by amplifier 104 and is applied to the other beam of dual beam oscilloscope 103. An R.M.S. voltmeter 105 is connected to the output of amplifier 102 and an R.M.S. voltmeter 106 is connected to the output of amplifier 104.

The function of R.M.S. voltmeter 106 is to measure the R.M.S. value of the resultant voltage ($V_{33}$) and the function of dual beam oscilloscope 103 is to determine the phase angle ($\phi$) between the resultant voltage ($V_{33}$) and the shear rigidity voltage component. It is possible to use the output voltage from amplifier 102 for this purpose since the shear rigidity component voltage is instantaneous and therefore in phase with this output voltage. The value of $x_0$ is readily determined from the R.M.S. input voltage measured by R.M.S. voltmeter 105. Since the only unknowns in the right hand side of Equations 13 and 15 are $V_{33}$, $x_0$ and $\phi$ it is possible to determine the magnitude of both shear viscosity and shear rigidity by the above measurements made by the device shown in FIGURE 9.

One example of particular characteristics and geometrics which has been found successful will now be presented for illustrative purposes. It is to be understood, however, that presentation of this illustrative example is not to be considered as limiting the present invention in any way.

In the embodiments shown, cylindrical section 49 is made of aluminum, has a length of about .5 inch, a thickness of about .03 inch, an inside diameter of about 1.1 inch, a Youngs modulus of about $10^7$ p.s.i. and a spring constant of about 2 pounds per micro inch. Driver assembly 43 has a Youngs modulus of about $1.2 \times 10^7$ and a spring constant of about 9.4 pounds per micro inch. It has been found that a force of about 1040 pounds will prevent separation at a frequency of operation of about 30 kilocycles.

Materials which have been tested by these embodiments have included lubricating oils, tars, silicones, polymers and the like where L has been adjusted between 0.006 inch and 0.030 inch to accommodate materials of higher rigidity. Solid materials have also been tested by attaching them firmly to surfaces 57 and 58 as by means of thin layers of adhesive having a high modulus of shear rigidity. Typical frequencies of operation have been from about 1 to about 2,000 cycles per second, typical temperature ranges from about −100° C. to about +150° C. and typical ambient static pressures from about 1 to about 15,000 p.s.i.

In FIGURE 10 is illustrated another embodiment of the present invention. This embodiment differs from the previously described embodiment in the manner in which mounting of the driver and sensing sections is accomplished. In the FIGURE 10 embodiment, piezoelectric plate 110 is mounted by bracket section 112 consisting of upper plate 113, insulation member 114 and bolts 115 which are threaded into mounting block 116. Mounting block 116 may be integral with or attached to frame 118. In FIGURE 10 capacitor plate electrode 120 is in electrical contact with mounting block 116 which may be considered as electrical ground. Capacitor plate electrode 121 is electrically insulated from ground by insulation member 114.

Driving section 12 is the same as described with relation to the previous embodiment and will therefore not be considered in detail. Driver section 12 of this embodiment is connected to frame 118 as by bolts 123 or the like.

This embodiment is not generally as desirable as the previously described embodiment since piezoelectric plate 110 is cantilever mounted and has a lower resonant frequency when a sinusoidal force is exerted on capacitor plate electrode 121 during operation. Whereas, in the previously described embodiment, piezoelectric plate 31 is supported on both sides thereby obviating this cantilever support and therefore higher frequencies may be obtained by the occurrence of a resonant condition.

In FIGURE 11 is illustrated still another embodiment of the present invention. This embodiment differs from the previously described embodiments in that plate 131 which may be integral with section 133 is mounted on mounting block 135. Mounting block 135 is cylindrical and has internal threads 136 mating with external threads 137 of driver section 141. Driver member 143 consists of circular plate 144 and a pair of parallel spaced apart plates 146 and 147 depending therefrom. The material to be tested is disposed between plate 146 and plate 131 and between plate 147 and the opposite surface of plate 131. By employing a pair of spaced apart parallel plates in this manner, an equal force is applied on opposite side of the center line of plate 131 and therefore resulting in equal and opposite moments. Since the moments are equal and opposite there is zero resulting torque applied to plate 131. This feature has been found to be extremely advantageous when the material being tested has a large shear modulus.

Another feature of this embodiment is to form plate 131 of a material having very large rigidity (for example, steel) and attaching a pair of strain gages 151 and 152 to sense strain induced in plate 131 when the device is being operated in the manner explained with relation to the previously described embodiments. Therefore, it is possible to measure the higher shear moduli of more rigid materials than is possible when plate 131 is made of piezoelectric materials. It is to be understood, however, that plate 131 may be made of piezoelectric material and measurements be made by use of its piezoelectric characteristics as explained with relation to the previous embodiments.

It will be readily apparent to one skilled in the art that many different structural supports may be employed and that dimensions, configurations, forces and materials incorporated into the driver and sensing sections may be changed. Accordingly, it is to be understood in connection with this invention that the embodiments shown are only exemplary, and that various modifications can be made in construction and arrangement within the scope of the invention as defined in the appended claims.

What is claimed is:

1. A device for measuring the shear rigidity and shear viscosity of a substance comprising a first member having a first plane surface, a second member having a second plane surface, said second member providing a voltage output proportional to the force applied to said second plane surface, said first plane surface being oppositely disposed and spaced from said second plane surface, the substance to be investigated being disposed in the space forced between and in intimate contact with said first and second plane surfaces, means for applying an oscillating motion to said first member and in the direction of said first plane of said first member thereby applying a shear force to said substance to be investigated, whereby the force transmitted through the material being investigated to said second plane surface is a function of the complex shear modulus of the material being investigated and the voltage output of said second member being proportional to the shear viscosity and shear rigidity of the material being investigated.

2. A device for measuring the shear rigidity and shear viscosity of a substance, a voltage generator providing an output signal having a repeating predetermined configuration, first means responsive to said output signal for applying an oscillating shear force to a substance under investigation in accordance with said predetermined configuration, second means for detecting the force transmitted by the substance under investigation, said second means also providing a voltage output proportional to the vector sum of the shear rigidity and shear viscosity of the substance under investigation, third means for determining the component voltage proportional only to the shear rigidity and the component voltage proportional only to the shear viscosity of the material under investigation.

3. A device for measuring the shear rigidity and shear viscosity of a substance, a voltage generator providing an output signal having a repeating predetermined configuration, first means responsive to said output signal for applying an oscillating shear force to a substance under investigation in accordance with said predetermined configuration, second means for detecting the force transmitted by the substance under investigation, said second means also providing a voltage output proportional to the vector sum of the shear rigidity and shear viscosity of the substance under investigation, a device for measuring the voltage output of said second means, a device for measuring the voltage output of said voltage generator and a device for measuring the phase angle between the voltage output of said second means and the voltage output of said voltage generator for determining the component voltage proportional only to the shear rigidity and the component voltage proportional only to the shear viscosity of the material under investigation.

4. A device for measuring the shear rigidity and shear viscosity of a substance, a voltage generator providing an output signal having a repeating predetermined configuration, means responsive to said output signal for oscillating a substance under investigation in accordance with said predetermined configuration, means responsive to the force transmitted by the substance under investigation, said means providing a voltage output proportional to the vector sum of the shear rigidity and shear viscosity of the substance under investigation, a device for measuring the voltage output of said last mentioned means, a device for measuring the voltage output of said voltage generator and a device for measuring the phase angle between the voltage output of said last mentioned means and the voltage output of said voltage generator for determining the component voltage proportional only to the shear rigidity and the component voltage proportional only to the shear viscosity of the material under investigation, means for determining the component voltage proportional only to the shear rigidity and the component voltage proportional only to the shear viscosity of the material under investigation.

5. The device of claim 4 wherein said last mentioned means includes piezoelectric material.

6. The device of claim 4 wherein said last mentioned means includes a strain gage.

7. The device of claim 4 wherein said first mentioned means includes a pair of parallel spaced apart plates between which said second mentioned means is disposed.

References Cited by the Examiner
UNITED STATES PATENTS

| | | | |
|---|---|---|---|
| 2,490,452 | 12/49 | Mason | 73—54 |
| 2,738,670 | 3/56 | Coene | 73—60 |
| 2,774,239 | 12/56 | Fitzgerald | 73—60 |
| 2,878,670 | 3/59 | Martin | 73—60 |
| 3,033,027 | 5/62 | Peris et al. | 73—53 |

OTHER REFERENCES

Electrical Measurements Manual, by Dunn and Barker, Prentice-Hall Inc. Third printing, 1959, page 69, Patent Office Scientific Library TK275.D85.

RICHARD C. QUEISSER, *Primary Examiner.*